(12) United States Patent
Laraqui et al.

(10) Patent No.: US 10,172,066 B2
(45) Date of Patent: Jan. 1, 2019

(54) FLEXIBLE BEARER HANDLING (71) Applicant: Telefonaktiebolaget L M Ericsson (publ), Stockholm (SE)

(72) Inventors: Kim Laraqui, Solna (SE); Ioanna Pappa, Stockholm (SE); Tomas Thyni, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 913 days.

(21) Appl. No.: 14/119,815

(22) PCT Filed: Oct. 23, 2013

(86) PCT No.: PCT/SE2013/051230
§ 371 (c)(1),
(2) Date: Nov. 22, 2013

(87) PCT Pub. No.: WO2015/060754
PCT Pub. Date: Apr. 30, 2015

(65) Prior Publication Data
US 2016/0309389 A1    Oct. 20, 2016

(51) Int. Cl.
*H04J 3/22* (2006.01)
*H04W 4/00* (2018.01)
(Continued)

(52) U.S. Cl.
CPC .......... *H04W 40/02* (2013.01); *H04L 69/321* (2013.01); *H04W 76/12* (2018.02); *H04W 84/042* (2013.01); *H04W 84/12* (2013.01)

(58) Field of Classification Search
CPC ..... H04W 40/02; H04W 76/12; H04W 36/02; H04W 84/042; H04W 84/12;
(Continued)

(56) References Cited

U.S. PATENT DOCUMENTS

2003/0165161 A1* 9/2003 Kalliokulju ........... H04L 1/1607
                                                    370/466
2008/0069142 A1* 3/2008 Wu ....................... H04L 1/1874
                                                    370/469
(Continued)

FOREIGN PATENT DOCUMENTS

EP         2661051 A1    11/2013
WO    WO-2009023794 A1    2/2009
(Continued)

OTHER PUBLICATIONS

International Search Report and Written Opinion, Application No. PCT/SE2013/051230, dated Aug. 12, 2014, 10 pages.
(Continued)

*Primary Examiner* — Edan Orgad
*Assistant Examiner* — Vanneilian Lalchinthang
(74) *Attorney, Agent, or Firm* — Sage Patent Group (57) ABSTRACT

Embodiments presented herein relate to bearer handling, and particularly to a method, a network node, a computer program, and a computer program product for flexible bearer handling in a communications network. Packet data convergence protocol (PDCP) protocol data units (PDUs) are acquired. Individual PDCP PDUs are encapsulated into individual frames at at least one protocol layer above a bottom-most protocol layer. The individual frames are switched towards a packet switched network.

18 Claims, 5 Drawing Sheets

(51) Int. Cl.
*H04W 36/16* (2009.01)
*H04W 40/02* (2009.01)
*H04L 29/08* (2006.01)
*H04W 76/12* (2018.01)
*H04W 84/04* (2009.01)
*H04W 84/12* (2009.01)

(58) Field of Classification Search
CPC ............. H04W 36/0011; H04L 69/321; H04L 12/40013; H04L 1/1874; H04L 12/6418
USPC .......................................................... 370/338
See application file for complete search history.

(56) References Cited

U.S. PATENT DOCUMENTS

| | | | | |
|---|---|---|---|---|
| 2008/0205345 | A1* | 8/2008 | Sachs | H04W 36/0011 370/332 |
| 2012/0033635 | A1* | 2/2012 | Tang | H04L 5/0044 370/329 |
| 2012/0099531 | A1* | 4/2012 | Sfar | H04W 99/00 370/328 |
| 2012/0243462 | A1* | 9/2012 | Bucknell | H04B 7/155 370/315 |
| 2013/0242859 | A1* | 9/2013 | Celik | H04L 47/34 370/328 |
| 2013/0294379 | A1* | 11/2013 | Guo | H04W 80/02 370/329 |
| 2014/0016614 | A1* | 1/2014 | Velev | H04W 4/005 370/331 |
| 2014/0079022 | A1* | 3/2014 | Wang | H04W 36/22 370/331 |
| 2015/0078323 | A1* | 3/2015 | Song | H04W 28/18 370/329 |

FOREIGN PATENT DOCUMENTS

| | | |
|---|---|---|
| WO | WO-2009046112 A2 | 4/2009 |
| WO | WO-2010128009 A1 | 11/2010 |
| WO | WO-2012092855 A1 | 7/2012 |

OTHER PUBLICATIONS

"3GPP TS 36.323, V11.2.0", 3rd Generation Partnership Project; Technical Specification Group Radio Access Network; Evolved Universal Terrestrial Radio Access (E-UTRA); Packet Data Convergence Protocol (PDCP) specification, (Release 11), Mar. 2013, 27 pages, 3GPP, Volbonne, France.

"Tunneling protocol on the S1 and X2 interfaces", 3GPP TSG-RAN WG3 #53, Tdoc R3-061188, Aug. 28-Sep. 1, 2006, 4 pages, Ericsson, Tallinn, Estonia.

International Preliminary Report on Patentability for Application No. PCT/SE2013/051230, dated Feb. 9, 2016, 14 pages.

Written Opinion of the International Preliminary Examining Authority, Application No. PCT/SE2013/051230, dated Oct. 5, 2015, 5 pages.

* cited by examiner

FLEXIBLE BEARER HANDLING

CROSS-REFERENCE TO RELATED APPLICATIONS

This application is a National stage of International Application No. PCT/SE2013/051230, filed Oct. 23, 2013, which are hereby incorporated by reference.

TECHNICAL FIELD

Embodiments presented herein relate to bearer handling, and particularly to a method, a network node, a computer program, and a computer program product for flexible bearer handling in a communications network.

BACKGROUND

In mobile communication networks, there is always a challenge to obtain good performance and capacity for a given communications protocol, its parameters and the physical environment in which the mobile communication network is deployed.

Beyond the Long Term Evolution (LTE) standard for telecommunications and the LTE advanced standard for telecommunications, standardization bodies such as the third generation partnership project (3GPP) have no concrete plans in place to push through new global standards for telecommunications. For the foreseeable future, evolution of wireless and mobile access is therefore more likely to evolve around recycling and combinations of already standardized and known technologies. A couple of examples are to either run LTE over micro- or millimeter wave bands, or to put parts of a WiFi network under the control of a LTE core network. An example of this is the concept of multipath Transmission Control Protocol (TCP) transmission, where a user equipment (UE) is able to make use of two types of radio access technologies simultaneously, e.g. WiFi and LTE, for one regular TCP session.

Currently, LTE provides connectivity services via EPS (Evolved Packet Service) bearer(s) between a UE and a Packet Data Network Gateway (PGW). EPS bearers may be regarded as the fundamental connectivity service that LTE networks provide to their users. The PGW then provides access to services in the Internet domain or other, including the Internet Protocol (IP) Multimedia Subsystem (IMS).

In the network up to the Serving Gateway (SGW), the bearers from a particular UE are treated as a monolith, all to be routed to the same SGW and controlled the same way in the transport domain. This current handling of EPS bearers makes sense from a scalability and complexity standpoint, for example to handle a large number, such as millions, of simultaneous EPS bearers provided to large numbers of UEs in a network. Further, the scalability of the EPS bearers implies inflexibility at the edges of the LTE radio access networks, since the EPS bearers must be bookended according to specific requirements, most notably via nodes in the core parts of the networks, e.g., at the SGW and PGW.

Hence, there is a need for an improved bearer handling in communications networks.

SUMMARY

An object of embodiments herein is to provide improved bearer handling in communications networks.

The inventors of the enclosed embodiments have realized that there may be situations where a more flexible handling of bearers from an individual UE could be useful, particularly in applications related to mobile backhauling (MBH), to small cells providing both LTE and WiFi radio access to UEs, to scenarios where, for cost reasons, both the WiFi and LTE radio access of a small cell need to be controlled by the same control and management infrastructure, to enable so-called software defined networking (SDN) concepts to be applied inside LTE, to enable a more flexible use of LTE radio bearers as transport facilities for capillary systems, etc.

A particular object is therefore to provide flexible bearer handling in communications networks.

According to a first aspect there is presented a method for flexible bearer handling in a communications network. The method is performed by a network node. The method comprises acquiring packet data convergence protocol (PDCP) protocol data units (PDUs). The method comprises encapsulating individual PDCP PDUs into individual frames at at least one protocol layer above a bottom-most protocol layer. The method comprises switching the individual frames towards a packet switched network. The frames above the bottom-most protocol layer may thereby be individually switched. The bottom-most protocol layer may be a physical layer. The individual frames may be L2, L3, or L4 layer frames.

Advantageously this enables improved bearer handling in communications networks. Advantageously this enables the LTE connectivity to be used in un-orthodox ways. For example, this may increase the flexibility in handling the LTE bearers, whilst leveraging on standard packet switching.

Advantageously the herein provided mechanisms are applicable to other applications of LTE, e.g. LTE-over-non-IMT bands for mobile backhauling applications, or LTE as backhaul for various capillary applications.

By encapsulating the PDCP PDU into, for example, IEEE 802.3 frames, the EPS bearer may be detached from its current monolithic structure and provide a flexible connectivity service.

The user data and signaling messages carried over the encapsulated PDCP PDUs may already be ciphered and thus protected when transmitted over the switched Ethernet network (as defined by the switching of the individual frames). This means that there is no need to add additional security to protect radio resource signaling or user data than that already provided via LTE for UE traffic and signaling.

Advantageously, SDN and/or OpenFlow concepts and advances, to control all the radio bearers that are switched into the packet switched network.

According to a second aspect there is presented a network node for flexible bearer handling in a communications network. The network node comprises a processing unit. The processing unit is arranged to acquire packet data convergence protocol (PDCP) protocol data units (PDUs). The processing unit is arranged to encapsulate individual PDCP PDUs into individual frames at at least one protocol layer above a bottom-most protocol layer. The processing unit is arranged to switch the individual frames towards a packet switched network.

According to a third aspect there is presented a computer program for flexible bearer handling in a communications network, the computer program comprising computer program code which, when run on a network node, causes the network node to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
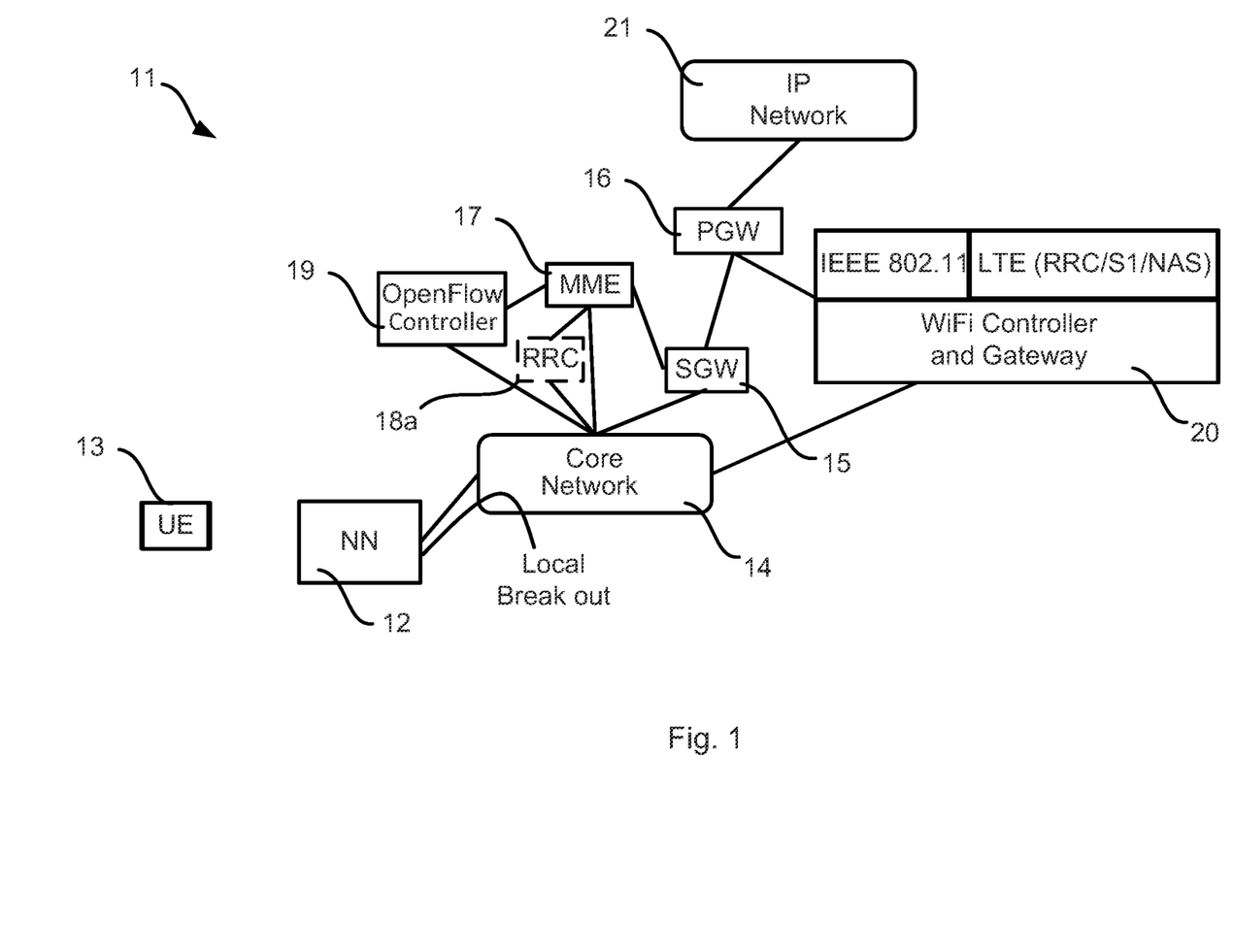
FIG. 1 is a schematic diagram illustrating a communications network according to embodiments.

FIG. 1 is a schematic diagram illustrating a communications network 11 where embodiments presented herein can be applied. The communications network 11 is a so called LTE based system. It should be pointed out that the terms "LTE" and "LTE based" system is here used to comprise both present and future LTE based systems, such as, for example, advanced LTE systems. It should be appreciated that although FIG. 1 shows a communications network 11 in the form of a LTE based system, the example embodiments herein may also be utilized in connection with other communications networks comprising nodes and functions that correspond to the nodes and functions of the communications network 11 in FIG. 1.

The communications network 11 comprises a network node 12 representing a base station in the form of an eNodeB, operatively connected to a Serving Gateway (SGW) 15 via interfaces of a core network 14, in turn operatively connected to a Mobility Management Entity (MME) 17 and a Packet Data Network (PDN) Gateway (PGW) 16, which in turn is operatively connected to packet switched IP service network 21. A radio terminal in the form of a user equipment 13 operatively connected to the network node 12 is thereby enabled to access services and data offered by the packet switched IP service network 21.

The eNodeB is thus the radio access node that interfaces with the radio terminal, which is denoted User Equipment (UE) 13 in LTE. The eNodeBs of the communications network 11 form the radio access network E-UTRAN for LTE. The SGW 15 routes and forwards user data packets, whilst also acting as the mobility anchor for the user plane during inter-eNB handovers and as the anchor for mobility between LTE and other 3GPP technologies (terminating the S4 interface and relaying the traffic between 2G/3G systems and the PGW 16). For idle state UEs, the SGW 15 terminates the downlink data path and triggers paging when downlink data arrives for the UE 13. It manages and stores UE contexts, e.g. parameters of the IP bearer service, network internal routing information. It also performs replication of the user traffic in case of lawful interception.

The MME 17 is responsible for idle mode UE tracking and paging procedure including retransmissions. It is involved in the bearer activation/deactivation process and is also responsible for choosing the SGW 16 for a UE 13 at the initial attach and at time of intra-LTE handover involving core network node relocation. It is responsible for authenticating the user (by interacting with a home subscriber server, HSS). Non-Access Stratum (NAS) signalling terminates at the MME 17 and is also responsible for generation and allocation of temporary identities to UEs 13. The MME 17 checks the authorization of the UE 13 to camp on the service provider's Public Land Mobile Network (PLMN) and enforces UE roaming restrictions. The MME 17 is the termination point in the network for ciphering/integrity protection for NAS signaling and handles the security key management. Lawful interception of signaling is also supported by the MME 17. The MME 17 also provides a control plane function for mobility between LTE and 2G/3G access networks with the S3 interface terminating at the MME 17 from a serving general packet radio service (GPRS) support node (SGSN) of the 2G/3G access networks. The MME 17 also terminates the S6a interface towards the HSS for roaming UEs The PGW 16 provides connectivity to the UE 13 to the external packet switched IP service network 21 by being the point of exit and entry of traffic for the UE 13. A UE 13 may have simultaneous connectivity with more than one PGW 16 for accessing multiple PDNs. The PGW 16 performs policy enforcement, packet filtering for each user, charging support, lawful Interception and packet screening. Another role of the PGW is to act as the anchor for mobility between 3GPP and non-3GPP technologies such as WiMAX and 3GPP2 (CDMA 1X and EvDO).

In general terms, a plurality of network nodes 12 are connected via a switched network. Depending on how much of the control functions that are centralized, the core network 14 may comprise a shared radio resource control (RRC)

engine 18a that acts as common resource controller of all the network nodes 12, and that can act as control point for macro cell coordination.

Further, if a small cell Ethernet (or other packet solution) connectivity is controlled by a controller 19, such as an OpenFlow controller, then the MME 17 can issue its transport related bearer control messages to the controller 19.

The controller 19 can then set the Ethernet switching connectivity accordingly.

The communications network 11 further comprises a WiFi controller and/or gateway 20. 3GPP entities may be emulated inside the WiFi controller and/or gateway 20. This may be accomplished by using a specific purpose protocol binding in support of LTE.

Figure 2:
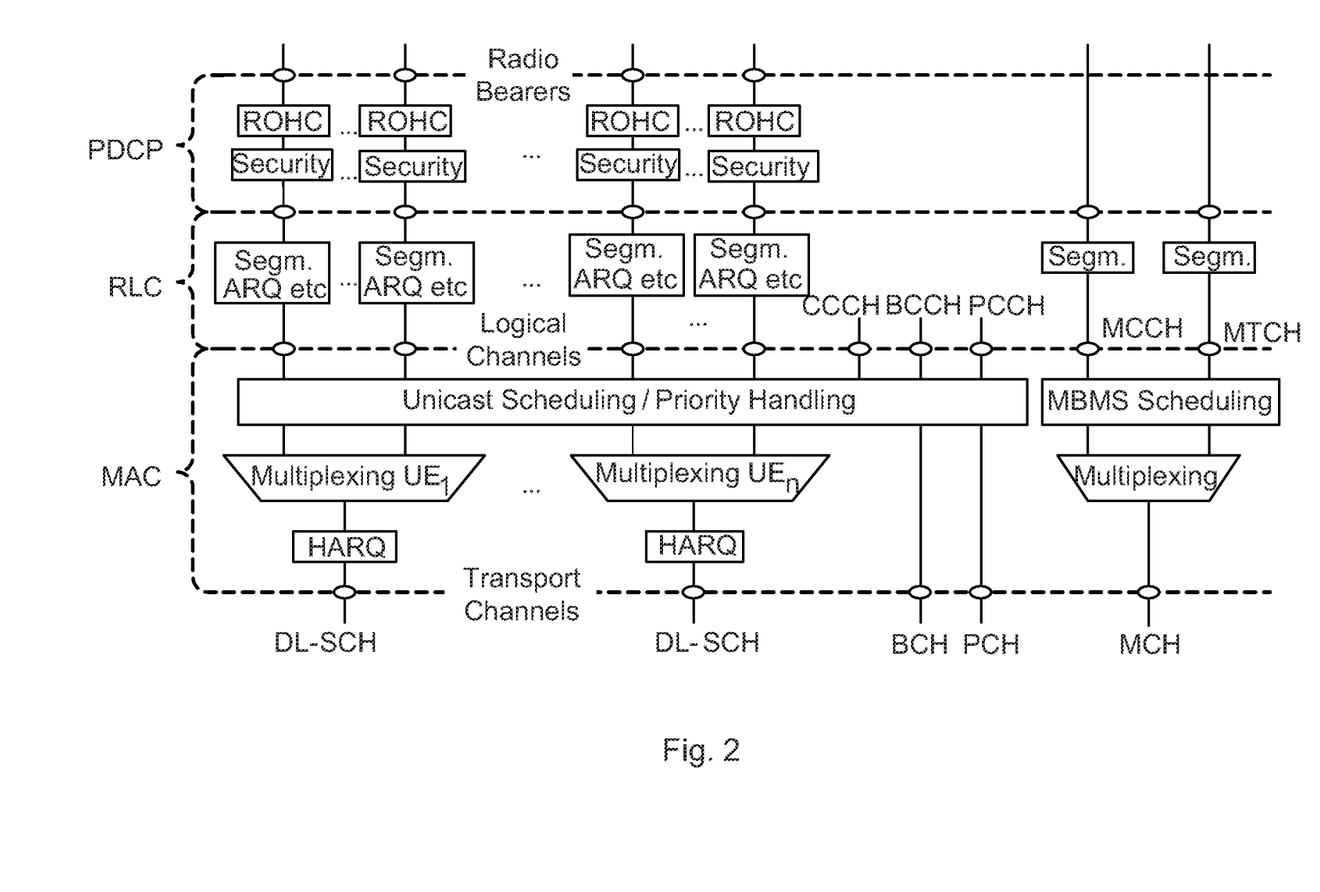
FIG. 2 is a schematic diagram illustrating a downlink Layer 2 structure.

FIG. 2 schematically illustrates, in accordance with LTE, parts of the network node side of the air interface towards the UE. The radio access is implemented by means of a number of protocols, most notably the Medium Access Control (MAC), Radio Link Control (RLC), and Packet Data Convergence (PDCP) Protocols. The UE side uses the same protocols.

In general terms, the MAC protocol is for example used during the mapping of logical channels to transport channels, and during scheduling resources over the air interface. There are a number of such channels. For each UE 13 operatively connected to the network node 12, the network node 12 uses a separate instance of a DL-SCH (Downlink Shared Channel), over which it multiplexes different logical channels to and from the UE 13. The MAC protocol also uses special control channels;

The Broadcast Control Channel (BCCH) provides system information to all UEs 13 operatively connected to the network node 12; the Paging Control Channel (PCCH) is used for paging information when searching a UE 13 on a network; the Common Control Channel (CCCH) is used for random access information, e.g. for actions including setting up a connection. CCCH is used to signal to a UE 13 before a special signaling channel has been established to that UE 13. The MAC protocol keeps track of which logical channels it uses, by means of Logical Channel IDs (LCID) in its MAC PDU frames. In this way, the MAC protocol knows how to demultiplex the content it receives from the transport channel onto different logical channels.

Over each logical channel, LTE employs a Radio Link Control (RLC) protocol entity for error correction, concatenation and reassembly, duplicate detection etc. The PDCP entity, which in the protocol structure is positioned above the RLC entity, mainly provides robust header compression (ROHC) and security, such as ciphering/deciphering of user data. User data is normally in the form of IP packets to and from the UE 13. This packet is then mapped onto a transport tunnel, e.g., using GTP (GPRS Tunneling Protocol) back/from the core network 14.

As can be seen in FIG. 2, there is one PDCP entity per radio bearer. There are two kinds of radio bearers; Signaling Radio Bearers (SRB1 and SRB2) and Data Radio Bearers (DRB 1-8). A DRB, when concatenated with an S1 and an S5/S8 bearer in the transport domain, forms the EPS bearer. The EPS bearer may be regarded as the fundamental connection entity in a LTE based communications network and provides end-to-end services between a UE 13 and the packet switched IP service network 21. The bearer architecture is illustrated in FIG. 3.

As for SRB, there are two dedicated SRBs defined: SRB1 to carry RRC signaling to control the radio bearers, and SRB2 to control the transport parts of Non-Access Stratum. SRB2 can carry signaling between the UE 13 and the MME 17. SRB1 can also be used for MME signaling before SRB2 has been established.

Via its service interface to the PDCP entity, RLC provides the PDCP PDU. This PDU is ciphered and compressed.

Figure 3:
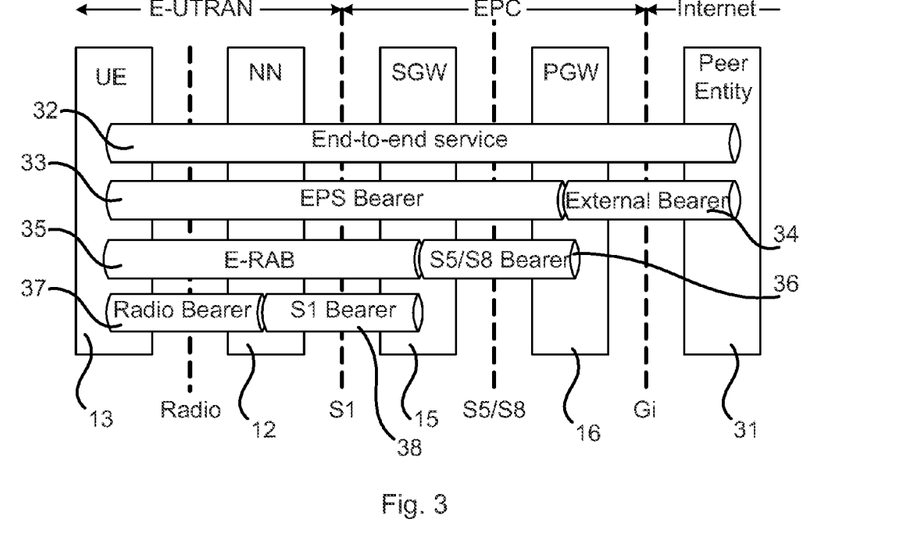
FIG. 3 is a schematic diagram illustrating the EPS bearer service architecture.

FIG. 3 schematically illustrates the bearer architecture in an LTE based communications network. An end-to-end service bearer 32 is established between a UE 13 and a peer entity 31. The peer entity 32 may be another UE. In turn, the end-to-end service bearer 32 comprises an EPS bearer 33 between the UE 13 and the PGW 16 and an external bearer 34 between the PGW 16 and the peer entity 31. In turn, the EPS bearer 33 comprises an Evolved Universal Terrestrial Radio Access Network (E-UTRAN) Radio Access Bearer (E-RAB bearer) 35 between the UE 13 and the SGW 15 and an S5/S8 bearer 36 between the SGW 15 and the PGW 16. In turn, the E-RAB bearer 35 comprises a radio bearer 37 between the UE 13 and the network node 12 and an S1 bearer 38 between the network node 12 and the SGW 15.

Embodiments presented herein relate inter aria to treatment of EPS bearers 33. Embodiments presented herein enable individual treatment of bearers of the same UE 13, in a way that provides full flexibility to handle EPS bearers individually. This scheme is fully transparent to the LTE EPC (Evolved Packet Core) and is also applicable for other wireless UE connectivity services under other frameworks, including SDN/OpenFlow and others.

The embodiments disclosed herein thus relate to flexible bearer handling in a communications network. In order to obtain flexible bearer handling in a communications network there is provided a network node, a method performed by the network node, a computer program comprising code, for example in the form of a computer program product, that when run on a network node, causes the network node to perform the method.

Figure 4A:
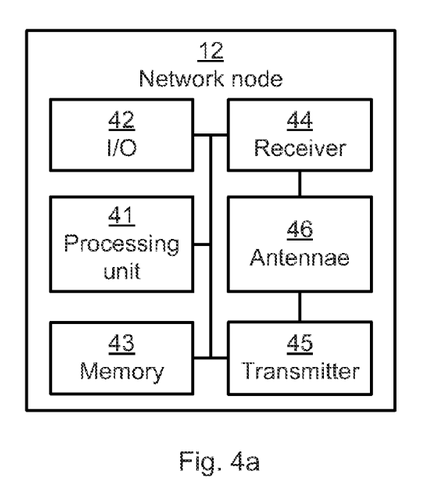
FIG. 4a is a schematic diagram showing functional modules of a network node according to an embodiment.

FIG. 4a schematically illustrates, in terms of a number of functional modules, the components of a network node 12 according to an embodiment. A processing unit 41 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 51 (as in FIG. 5), e.g. in the form of a memory 43. Thus the processing unit 41 is thereby arranged to execute methods as herein disclosed. The memory 41 may also comprise persistent storage, which, for example, can be any single one or combination of magnetic memory, optical memory, solid state memory or even remotely mounted memory. The network node 12 may further comprise an input/output (I/O) interface 42 for receiving and providing information to a another network node. The network node 12 also comprises one or more transmitters 45 and receivers 44, comprising analogue and digital components and a suitable number of antennae 46 for radio communication with the UE 13. The processing unit 41 controls the general operation of the network node 12, e.g. by sending control signals to the transmitter 45 and/or receiver 44 and receiving reports from the transmitter 45 and/or receiver 44 of its operation. Other components, as well as the related functionality, of the network node 12 are omitted in order not to obscure the concepts presented herein.

Figure 4B:
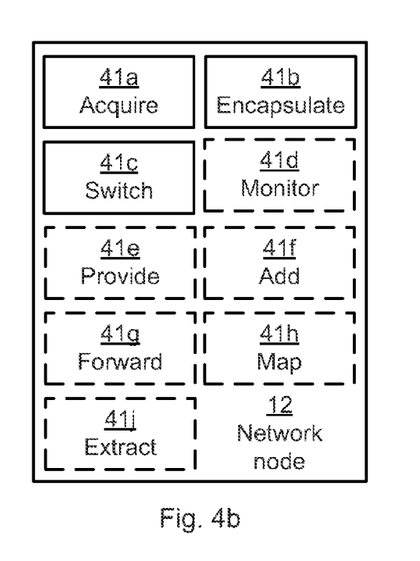
FIG. 4b is a schematic diagram showing functional units of a network node according to an embodiment.

FIG. 4b schematically illustrates, in terms of a number of functional units, the components of a network node 12 according to an embodiment. The network node 12 of FIG. 4b comprises a number of functional units; an acquiring unit 41a, an encapsulating unit 41, and a switching unit 41c. The network node 12 of FIG. 4b may further comprises a number of optional functional units, such as any of a monitoring unit 41d, a providing unit 41e, an adding unit 41f, a forwarding unit, 41g, a mapping unit 41h, and an extracting unit 41j. The functionality of each functional unit 41a-j will be further disclosed below in the context of which the functional units may be used. In general terms, each functional unit 41a-j may be implemented in hardware or in software. The processing unit 41-j may thus be arranged to from the memory 43 fetch instructions as provided by a functional unit 41a-j and to execute these instructions, thereby performing any steps as will be disclosed hereinafter.

Figure 4C:
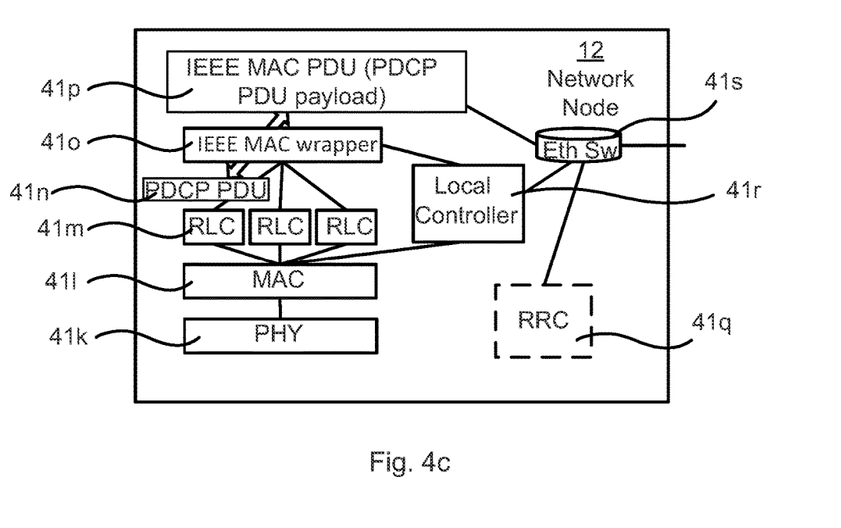
FIG. 4c is a schematic diagram showing logical units of a network node according to an embodiment.

FIG. 4c schematically illustrates in terms of a number of logical units, the components of a network node 12 according to an embodiment. The network node 12 comprises a physical layer (PHY) logical unit 41k, a medium access control layer (MAC) logical unit 41l, a plurality of radio link control (RLC) service interface logical units 41m, a IEEE MAC wrapper logical unit 41o for providing PDC PDUs 41n and IEEE MAC PDUs 41p (with PDCP PDU payload), an Ethernet switch logical unit 41s, a local controller logical unit 41r, and an optional radio resource control (RRC) logical unit 41q. For example, as will be further disclosed below, in case the RRC is to be located in the network node 12, the IEEE MAC PDUs can still be switched to the local RRC logical unit 41q. DRBs can still be forwarded towards the core network.

An Ethernet connection from the Ethernet switch logical unit 41s enables the local controller logical unit 41r to feed the system with system parameter values in case needed (as a consequence of moving e.g. the RRC out of the system).

Figure 5:
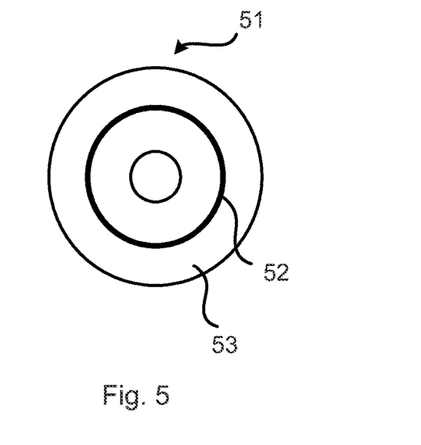
FIG. 5 shows one example of a computer program product comprising computer readable means according to an embodiment.
Figure 6:
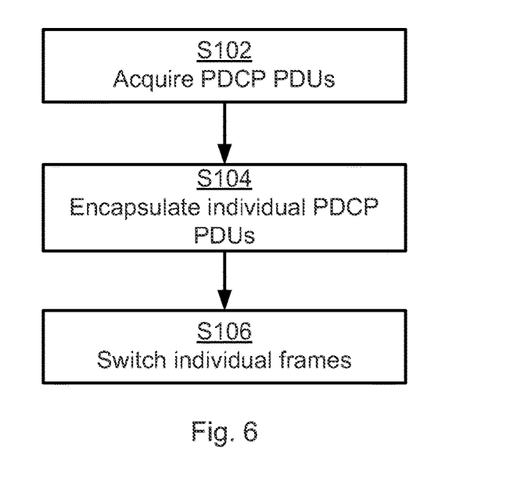
FIGS. 6 and 7 are flowcharts of methods according to embodiments.
Figure 7:
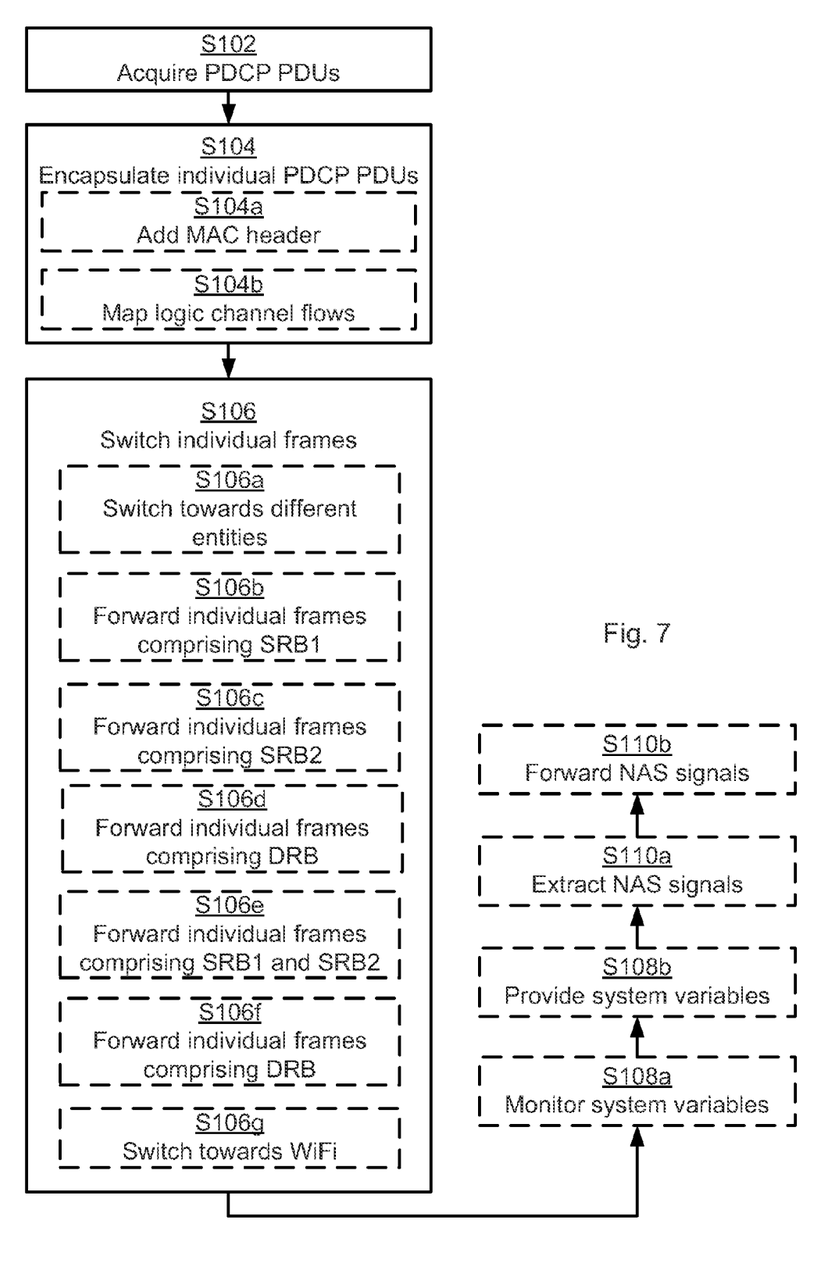

FIGS. 6 and 7 are flow chart illustrating embodiments of methods for flexible bearer handling in a communications network. The methods are performed by the network node 12. The methods are advantageously provided as computer programs 52. FIG. 5 shows one example of a computer program product 51 comprising computer readable means 53. On this computer readable means 53 a computer program 52 can be stored, which computer program 52 can cause the processing unit 41 and thereto operatively coupled entities and devices, such as the memory 43, the I/O interface 42, the transmitter 45, the receiver 44 and/or the antennae 46 to execute methods according to embodiments described herein. The computer program 52 and/or computer program product 51 may thus provide means for performing any steps as herein disclosed.

In the example of FIG. 5, the computer program product 51 is illustrated as an optical disc, such as a CD (compact disc) or a DVD (digital versatile disc) or a Blu-Ray disc. The computer program product 51 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 52 is here schematically shown as a track on the depicted optical disk, the computer program 52 can be stored in any way which is suitable for the computer program product 51.

Reference is now made to the flow chart of FIG. 6 illustrating an embodiment of a method for flexible bearer handling in a communications network 11 as performed by a network node 12.

The processing unit 41 of the network node 12 is arranged to, in a step S102, acquire packet data convergence protocol (PDCP) protocol data units (PDUs).

The acquiring may be performed by executing functionality of the acquiring unit 41a. The computer program 52 and/or computer program product 51 may thus provide means for this acquiring. The PDCP PDUs may originate from a UE 13 and thus first be received through the antenna 46 and then the receiver 44 of the network node 12 before being acquired by the processing unit 41. Example of data carried by the PDUs will be provided below.

The PDCP PDUs are then treated individually by the network node 12, particularly each PDCP PDU is by the network node 12 encapsulated in individual frames above a bottom-most protocol layer. Thus, the processing unit 41 of the network node 12 is arranged to, in a step S104, encapsulate individual PDCP PDUs into individual frames at at least one protocol layer above the bottom-most protocol layer. The encapsulating may be performed by executing functionality of the encapsulating unit 41b. The computer program 52 and/or computer program product 51 may thus provide means for this encapsulating.

The thus individually encapsulated PDCP PDUs are then transmitted towards a packet switched network, such as the core network 14, and optionally further towards the IP network 21. The processing unit 41 of the network node 12 is arranged to, in a step S106, switch the individual frames towards a packet switched network. The switching may be performed by executing functionality of the switching unit 41c. The computer program 52 and/or computer program product 51 may thus provide means for this switching. The individual frames may thereby be individually switched. The individual frames are by the processing unit 41 provided to the I/O interface 42 or the transmitter 45 for transmission from the network node 12.

The bottom-most protocol layer may be a physical layer. The individual frames may be L2, L3, or L4 layer frames.

This inter alia enables PDCP PDUs to be encapsulated into IEEE 802.3 frames or similar, according to an algorithmic method that can operate in a 3o stateless fashion. This introduce more flexibility in handling inter alia LTE radio bearers by means of a local Ethernet switch or similar in the network node 12. As will be further disclosed below, the resulting packetized PDUs may be used to implement flexible switching of various PDCP PDUs, inter alia enabling individually switching of PDUs that are carrying SRB1, SRB2, and DRBs.

Embodiments relating to further details of flexible bearer handling in a communications network 11 as performed by a network node 12 will now be disclosed. Reference is made to the flow chart of FIG. 7 illustrating further embodiments of methods for flexible bearer handling in a communications network 11 as performed by a network node 12.

There may be different ways to encapsulate individual PDCP PDUs into individual frames, as in step S104 above. Different embodiments relating thereto will now be described in turn.

There may be different types of frames above the bottom-most protocol layer that the individual PDCP PDUs are encapsulated into. According to an embodiment the individual frames are either IEEE Ethernet frames, IEEE 802.3 frames, Internet Protocol (IP), frames, multiprotocol label switching (MPLS), frames, metro Ethernet forum specification 22 (MEF 22) frames, layer 2 virtual private network (L2VPN) frames, High-Level Data Link Control (HDLC) frames, Optical Transport Network (OTN) frames, Synchronous Digital Hierarchy (SDH) frames, Plesiochronous digital hierarchy (PDH) frames, Digital Subscriber Line (DSL) frames, Transmission Control Protocol (TCP) frames, User Datagram Protocol (UDP) frames, or Hypertext Transfer Protocol (HTTP) frames.

The encapsulating may involve adding headers to the PDCP PDUs. These headers may, for example, be either MAC headers or MPLS headers. According to an embodiment the processing unit 41 of the network node 12 is thus arranged to, in an optional step S104*a*, add an individual MAC header or an individual MPLS header to each PDCP PDU. The adding may be performed by executing functionality of the adding unit 41*f*. The computer program 52 and/or computer program product 51 may thus provide means for this adding.

Each individual frame may comprise either a first signal radio bearer (SRB1), a second signal radio bearer (SRB2), or a data radio bearer (DRB). Alternatively, each individual frame may comprise a combination of different such bearers, where the different bearers are differentiated by the use of protocol discriminators within the frame.

For example, the network node 12 may derive a locally administered (private) 48 bit IEEE MAC address based on e.g. a scheme as follows: 8 bits specific to the network node ID+4 bits based on MAC LCID thus also identifying if the PDCP PDU belongs to SRB1 or SRB2 or DRB1-8+8 bits unique for each UE/logical channel on the network node 12.

The network node 12 may thus add the resulting IEEE 802.3 MAC header to the PDCP PDU, and forward the resulting IEEE Ethernet frame to a local switch. According to an embodiment the processing unit 41 of the network node 12 is arranged to, in an optional step S104*b*, map logic channel flows to network addresses, such as MAC addresses. The mapping may be performed by executing functionality of the mapping unit 41*h*. The computer program 52 and/or computer program product 51 may thus provide means for this mapping. For each PDCP PDU, the network node 12 may thus keep track of which UE 13 and logical channel it serves. This is visible from the MAC PDU level.

There may be different ways to individually switch the individual frames. Different embodiments relating thereto will now be described in turn.

For example, the processing unit 41 may act as a local Ethernet switch. In this role the processing unit 41 may switch Ethernet frames (comprising the PDCP PDUs) according to several schemes, e.g. inspired by OpenFlow schemes. For example, the processing unit 41 of the network node 12 may act as a local controller. In this role the processing unit 41 may be responsible for providing system variables. Thus, according to an embodiment the processing unit 41 of the network node 12 is arranged to, in an optional step S108*a*, explicitly provide system variables used by local protocol layers in the network node. The providing may be performed by executing functionality of the providing unit 41*e*. The computer program 52 and/or computer program product 51 may thus provide means for this providing. The processing unit 41 of the network node 12 may be arranged to, in an optional step S108*b*, explicitly extract the system variables to be used by protocol layers exported to network node external entities. The extracting may be performed by executing functionality of the extracting unit 41*j*. The computer program 52 and/or computer program product 51 may thus provide means for this extracting.

For example, during the step of individually switching the individual frames (step S106) the network node 12 may identify the type of PDCP PDU carried and forward all SRB1 packets to a centrally located entity implementing a remote radio unit (RRC) finite state machine (FSM). Similarly, it can forward SRB2 packets to a centrally located node implementing S1-AP and NAS functions. In case the RRC shall remain as a local entity on the network node 12 (see below), the PDCP flow of the SRB1 needs not be processed as described above but can be terminated locally.

According to an embodiment the step S106 of individually switching involves the processing unit 41 of the network node 12 to be arranged to, in an optional step S106*a*, switch individual frames towards different network entities, such as towards different physical or logical network nodes. The switching may be performed by executing functionality of the switching unit 41*c*. The computer program 52 and/or computer program product 51 may thus provide means for this switching. A centrally located controller 19 may thereby decide to drop any DRB carrying user data locally on the network node 12 or anywhere in the network. Since the controller 19 may have a full picture of ingress and egress points for LTE bearers, it can enforce consistency for the down- and uplink traffic flows of a particular bearer connection.

There may be different ways to implement the functionality of the RRC. Different embodiments relating thereto will now be described in turn.

For example, the RRC may be part of the network. Thus according to an embodiment the step S106 of individually switching involves the processing unit 41 of the network node 12 to be arranged to, in an optional step S106*b*, forward individual frames comprising the SRB1 to an RRC entity in the network; and in an optional step S106*c*, forward individual frames comprising the SRB2 to an S1-AP and NAS entity in the network. The DRB may be forwarded to the SGW 15. Thus according to an embodiment the step S106 of individually switching involves the processing unit 41 of the network node 12 to be arranged to, in an optional step S106*d*, forward the individual frames comprising DRB packets to a serving gateway (SGW) acting entity 15 in the network 11. The forwarding may be performed by executing functionality of the forwarding unit 41*g*. The computer program 52 and/or computer program product 51 may thus provide means for this forwarding. The same channel could be used to enable regular S1-AP signaling between the network node 12 and the MME 17.

For example, the RRC may be part of the network node 12. Thereby IEEE MAC PDUs may be switched to the local entity implementing RRC, and DRBs may be forwarded towards the core network 14. Thus according to an embodiment the step S106 of individually switching involves the processing unit 41 of the network node 12 to be arranged to, in an optional step S106*e*, forward individual frames comprising the SRB1 and individual frames comprising the SRB2 to an RRC entity in the network node 12; and, in an optional step S106*f*, forward individual frames comprising DRBs to the network. The forwarding may be performed by executing functionality of the forwarding unit 41*g*. The computer program 52 and/or computer program product 51 may thus provide means for this forwarding.

There may be different ways to handle simultaneously use of WiFi. For example, in case a best effort DRB is setup from a UE 13 that also simultaneously has an active WiFi connection, the network node 12 may determine to switch Ethernet frame encapsulating its PDCP PDU to the same location as where the WiFi frame is processed. A UE 13, associated with the PDCP PDUs, may thus have a simultaneous active WiFi connection. According to an embodiment the step S106 of individually switching therefore involves the processing unit 41 of the network node 12 to be arranged to, in an optional step S106g, switch the individual frames towards a WiFi controller and/or gateway 20 where WiFi frames of the active WiFi connection are processed. The switching may be performed by executing functionality of the switching unit 41c. The computer program 52 and/or computer program product 51 may thus provide means for this switching.

There may be different ways to handle so-called local break out scenarios. For example, radio bearers may be looped locally. Assume, for example, that two UEs are operatively connected to the same network node 12. Instead of switching traffic between two UEs through the core network 14, the network node 12 may decided to directly forward traffic from one of the two UEs to the other of the two UEs, without first switching the traffic towards the core network 14. According to an embodiment the processing unit 41 of the network node 12 is arranged to, in an optional step S106g, switch DRB flows directly between two entities operatively connected to the network node 12. The switching may be performed by executing functionality of the switching unit 41c. The computer program 52 and/or computer program product 51 may thus provide means for this switching. The local break out facilities enable effective packet switching of user traffic. This includes the possibility of looping radio bearers locally, whilst still keeping control of radio resources via a centrally located RRC 18a.

There may be different ways to handle NAS signalling. In order to enable NAS message exchanges over SRB1 and SRB0 (before a dedicated signaling channel has been established), NAS signals may be extracted and forwarded on an S1-AP interface or similar. This may be achieved via a special management channel that can be identified via a reserved local IEEE MAC address. This will also enable special commands to be implemented in case parameters need to be explicitly set. According to an embodiment the processing unit 41 of the network node 12 is therefore arranged to, in an optional step S110a, extract NAS signals from the PDCP PDUs; and, in an optional step S110b, forward the extracted NAS signals to an S1-AP signalling service. The extracting may be performed by executing functionality of the extracting unit 41j. The computer program 52 and/or computer program product 51 may thus provide means for this extracting.

There may be different ways to handle security aspects of the PDCP PDUs. Different embodiments relating thereto will now be described in turn.

For example, the ciphered and integrity protected SRB/DRB PDCP PDUs may not be manipulated in the network node 12. For example, the SRS/DRB PDCP PDUs may not be deciphered. According to an embodiment the PDCP PDUs remain ciphered during the steps of encapsulating (step S104) and switching (step S106).

In summary, there have been disclosed mechanisms for flexible bearer handling in a communications network. These mechanism may, according to some of the presented embodiments, involve encapsulating PDCP PDUs into IEEE 802.3 frames or similar, according to an algorithmic method that can operate in a stateless fashion, so as to introduce more flexibility in handling LTE radio bearers by means of a local Ethernet switch or similar. The resulting packetized PDUs may be used to implement flexible switching of various PDCP PDUs, e.g. individually switching PDUs that are carrying SRB1, SRB2, and DRBs. The disclosed mechanisms for flexible bearer handling in a communications network may be used to implement a split architecture of signaling and data radio bearers, so that each can terminate on entities located in different physical or logical nodes. The disclosed mechanisms for for flexible bearer handling in a communications network may be used to combine an Open-Flow type of packet switched network with MME transport control and RRC radio bearer control to achieve tight coordination between radio and transport for small cells.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although the embodiments presented above may be regarded as focusing on uplinks signalling, the enclosed patent claims are not limited in this way and thus equally apply to downlink signalling. Additionally, although the enclosed embodiments relate to encapsulating individual PDCP PDUs into individual frames above the bottom-most protocol layer, also more than one PDCP PDU, such as two or three PDCP PDUs, but preferably at most ten PDCP PDUs, more preferably at most five PDCP PDUs, and even more preferably less than five PDCP PDUs, may be encapsulated into each frame above the bottom-most protocol layer. Thus, as an example within this variation, two PDCP PDUs could be encapsulated into one L4 frame.

ABBREVIATIONS

DRB Data Radio Bearer
EPC Evolved Packet Core (LTE Core)
L1 Protocol layer one
L2 Protocol layer two
L3 Protocol layer three
L4 Protocol layer four
LTE Long Term Evolution
MAC Medium Access Control
MME Mobility Management Entity
MPLS Multipurpose Label Switching
NAS Non-Access Stratum
PDU Protocol Data Unit
PDCP Packet Data Convergence Protocol
PGW Packet Data Network Gateway
RLC Radio Link Control
RRC Radio Resource Control
S1-AP S1 Application Protocol/Part
SGW Serving Gateway
SRB Signaling Radio Bearer
SW Switch
UE User Equipment (Terminal, Cellular Phone)
VLAN Virtual LAN

The invention claimed is:

1. A method performed by a network node for flexible bearer handling in a communications network, the method comprising:
  acquiring packet data convergence protocol (PDCP) protocol data units (PDUs);
    encapsulating individual PDCP PDUs into individual frames at a protocol layer that is at least one protocol layer above a bottom-most protocol layer, wherein encapsulating said individual PDCP PDUs into said individual frames comprises mapping logic channel flows to network addresses, wherein each frame of said individual frames comprises a first signal radio bearer (SRB1), a second signal radio bearer (SRB2), a data radio bearer (DRB) or a combination of different bearers; and
  switching said individual frames towards a packet switched network, the switching based at least in part on identifying a type of PDCP PDU carried by each of said individual frames, wherein switching said individual frames towards the packet switched network comprises:
forwarding said individual frames comprising the SRB1 to a radio resource control (RRC) acting-entity in the network; and
forwarding said individual frames comprising the SRB2 to an S1-AP and non-access stratum (NAS) acting-entity in the network.

2. The method according to claim 1, further comprising:
explicitly providing system variables used by local protocol layers in the network node; and
explicitly extracting the system variables to be used by protocol layers exported to network node external entities.

3. The method according to claim 1, wherein said bottom-most protocol layer is a physical layer, wherein said individual frames are L2, L3, or L4 frames, and wherein the L2, L3, or L4 frames are IEEE Ethernet frames, IEEE 802.3 frames, Internet Protocol (IP) frames, multiprotocol label switching (MPLS) frames, metro Ethernet forum specification 22 (MEF 22) frames, layer 2 virtual private network (L2VPN) frames, High-Level Data Link Control (HDLC) frames, Optical Transport Network (OTN) frames, Synchronous Digital Hierarchy (SDH) frames, Plesiochronous digital hierarchy (PDH) frames, Digital Subscriber Line (DSL) frames, Transmission Control Protocol (TCP) frames, User Datagram Protocol (UDP) frames, or Hypertext Transfer Protocol (HTTP) frames.

4. The method according to claim 1, wherein encapsulating individual PDCP PDUs into individual frames further comprises:
adding an individual Medium Access Control (MAC) header or an individual Multiprotocol Label Switching (MPLS) header to each PDCP PDU.

5. The method according to claim 1, wherein switching said individual frames towards the packet switched network comprises:
switching said individual frames towards different network entities, wherein the different network entities include one or more of different physical network nodes, and different logical network nodes.

6. The method according to claim 1, wherein switching said individual frames towards a packet switched network comprises:
forwarding said individual frames comprising the DRB to a serving gateway (SGW) acting entity in the network.

7. The method according to claim 1, wherein switching said individual frames towards the packet switched network comprises:
forwarding said individual frames comprising the SRB1 and said individual frames comprising the SRB2 to a radio resource control (RRC) entity in the network node; and
forwarding said individual frames comprising DRBs to the network.

8. The method according to claim 1, wherein the network addresses include Medium Access Control (MAC) addresses.

9. The method according to claim 1, wherein the PDCP PDUs remain ciphered during the encapsulating and the switching.

10. The method according to claim 1, wherein a User Equipment (UE) associated with the PDCP PDUs has a simultaneous active WiFi connection, and wherein switching said individual frames towards the packet switched network comprises:
switching said individual frames towards a WiFi controller or gateway where WiFi frames of the active WiFi connection are processed.

11. The method according to claim 1, further comprising:
extracting non-access stratum (NAS) signals from the PDCP PDUs; and forwarding the extracted NAS signals to an SI-AP signalling service.

12. The method according to claim 1, further comprising:
switching data radio bearer (DRB) flows directly between two entities operatively connected to the network node.

13. A network node for flexible bearer handling in a communications network, the network node comprising:
a processor;
a non-transitory computer-readable storage medium coupled to the processor, the computer-readable storage medium storing instructions which, when executed by the processor, cause the network node to:
acquire packet data convergence protocol (PDCP) protocol data units (PDUs);
encapsulate individual PDCP PDUs into individual frames at a protocol layer that is at least one protocol layer above a bottom-most protocol layer, wherein encapsulating said individual PDCP PDUs into said individual frames comprises mapping logic channel flows to network addresses, wherein each frame of said individual frames comprises a first signal radio bearer (SRB1), a second signal radio bearer (SRB2), a data radio bearer (DRB) or a combination of different bearers; and
switch said individual frames towards a packet switched network, the switching based at least in part on identifying a type of PDCP PDU carried by each of said individual frames, wherein switching said individual frames towards the packet switched network comprises:
forwarding said individual frames comprising the SRB1 to a radio resource control (RRC) acting-entity in the network; and
forwarding said individual frames comprising the SRB2 to an S1-AP and non-access stratum (NAS) acting-entity in the network.

14. The network node according to claim 13, wherein the network node comprises functionalities of a base transceiver station (BTS), a Node B, or an eNodeB.

15. A non-transitory computer memory of a network node storing instructions which, when executed by a processor, cause performance of operations comprising:
acquiring packet data convergence protocol (PDCP) protocol data units (PDUs);
encapsulating individual PDCP PDUs into individual frames at a protocol layer that is at least one protocol layer above a bottom-most protocol layer, wherein encapsulating said individual PDCP PDUs into said individual frames comprises mapping logic channel flows to network addresses, wherein each frame of said individual frames comprises a first signal radio bearer (SRB1), a second signal radio bearer (SRB2), a data radio bearer (DRB) or a combination of different bearers; and
switching said individual frames towards a packet switched network, the switching based at least in part on identifying a type of PDCP PDU carried by each of said individual frames, wherein switching said individual frames towards the packet switched network comprises:
  forwarding said individual frames comprising the SRB1 to a radio resource control (RRC) acting-entity in the network; and
  forwarding said individual frames comprising the SRB2 to an S1-AP and non-access stratum (NAS) acting-entity in the network.

16. The non-transitory computer memory of claim 15, wherein the instructions, when executed by the processor, further cause operations comprising:
  explicitly providing system variables used by local protocol layers in the network node; and
  explicitly extracting the system variables to be used by protocol layers exported to network node external entities.

17. The non-transitory computer memory of claim 15, wherein said bottom-most protocol layer is a physical layer, wherein said individual frames are L2, L3, or L4 frames, and wherein the L2, L3, or L4 frames are IEEE Ethernet frames, IEEE 802.3 frames, Internet Protocol (IP) frames, multiprotocol label switching (MPLS) frames, metro Ethernet forum specification 22 (MEF 22) frames, layer 2 virtual private network (L2VPN) frames, High-Level Data Link Control (HDLC) frames, Optical Transport Network (OTN) frames, Synchronous Digital Hierarchy (SDH) frames, Plesiochronous digital hierarchy (PDH) frames, Digital Subscriber Line (DSL) frames, Transmission Control Protocol (TCP) frames, User Datagram Protocol (UDP) frames, or Hypertext Transfer Protocol (HTTP) frames.

18. The non-transitory computer memory of claim 15, wherein encapsulating the individual PDCP PDUs into individual frames further comprises:
  adding an individual Medium Access Control (MAC) header or an individual Multiprotocol Label Switching (MPLS) header to each PDCP PDU.

* * * * *

UNITED STATES PATENT AND TRADEMARK OFFICE
CERTIFICATE OF CORRECTION

PATENT NO. : 10,172,066 B2  
APPLICATION NO. : 14/119815  
DATED : January 1, 2019  
INVENTOR(S) : Laraqui et al.

Page 1 of 2

It is certified that error appears in the above-identified patent and that said Letters Patent is hereby corrected as shown below:

In the Drawings

In Fig. 4a, Sheet 3 of 5, for Tag "46", in Line 1, delete "Antennae" and insert -- Antenna --, therefor.

In the Specification

In Column 4, Line 34, delete "SGW 16" and insert -- SGW 15 --, therefor.

In Column 6, Line 9, delete "peer entity 32" and insert -- peer entity 31 --, therefor.

In Column 6, Line 20, delete "aria" and insert -- alia --, therefor.

In Column 6, Line 47, delete "memory 41" and insert -- memory 43 --, therefor.

In Column 6, Line 52, delete "a another" and insert -- another --, therefor.

In Column 6, Line 55, delete "antennae" and insert -- antenna --, therefor.

In Column 7, Line 1, delete "encapsulating unit 41," and insert -- encapsulating unit 41b, --, therefor.

In Column 7, Line 10, delete "processing unit 41-j" and insert -- processing unit 41 --, therefor.

In Column 7, Lines 20-21, delete "IEEE MAC wrapper logical unit 410" and insert -- IEEE MAC wrapper logical unit 41o --, therefor.

In Column 7, Line 46, delete "antennae" and insert -- antenna --, therefor.

In Column 8, Line 40, delete "a 3o" and insert -- a --, therefor.

Signed and Sealed this  
Twenty-second Day of September, 2020

Andrei Iancu  
*Director of the United States Patent and Trademark Office*

In Column 10, Line 1, delete "remote radio unit (RRC) finite state machine (FSM)." and insert -- radio resource control (RRC), finite state machine (FSM). --, therefor.

In Column 11, Line 49, delete "SRS/DRB" and insert -- SRB/DRB --, therefor.

In the Claims

In Column 14, Line 10, in Claim 11, delete "SI-AP" and insert -- S1-AP --, therefor.